US009567030B2

(12) United States Patent
Maier

(10) Patent No.: US 9,567,030 B2
(45) Date of Patent: Feb. 14, 2017

(54) DEVICE FOR SHORTENING THE SPRING PATH OF A SUSPENSION FORK

(71) Applicant: Marzell Maier, Isny/Sommersbach (DE)

(72) Inventor: Marzell Maier, Isny/Sommersbach (DE)

(*) Notice: Subject to any disclaimer, the term of this patent is extended or adjusted under 35 U.S.C. 154(b) by 159 days.

(21) Appl. No.: 14/423,466

(22) PCT Filed: May 28, 2013

(86) PCT No.: PCT/DE2013/000288
§ 371 (c)(1),
(2) Date: Feb. 24, 2015

(87) PCT Pub. No.: WO2014/032637
PCT Pub. Date: Mar. 6, 2014

(65) Prior Publication Data
US 2015/0239524 A1   Aug. 27, 2015

(30) Foreign Application Priority Data
Aug. 28, 2012  (DE) .................. 10 2012 016 950

(51) Int. Cl.
*B62K 25/08* (2006.01)
*F16C 1/10* (2006.01)
*B62K 25/04* (2006.01)

(52) U.S. Cl.
CPC ............... *B62K 25/08* (2013.01); *F16C 1/10* (2013.01); *B62K 2025/045* (2013.01); *B62K 2025/048* (2013.01); *Y10T 74/20462* (2015.01)

(58) Field of Classification Search
CPC ............. B62K 25/08; B62K 2025/045; B62K 2025/047; B62K 2025/048
See application file for complete search history.

(56) References Cited

U.S. PATENT DOCUMENTS 6,631,915 B2 * 10/2003 Barefoot ................ B62K 25/08
280/276
2002/0074769 A1   6/2002 Barefoot

FOREIGN PATENT DOCUMENTS

| DE | 30 38 418 A1 | 7/1982 |
|---|---|---|
| DE | 298 10 431 U1 | 10/1999 |
| DE | 10 2004 034 639 A1 | 2/2006 |
| SK | 50081-2011 U1 | 1/2012 |
| WO | 2013/028138 A2 | 2/2013 |

OTHER PUBLICATIONS

International Search Report of PCT/DE2013/000288, mailed Oct. 15, 2013.

* cited by examiner

*Primary Examiner* — Kevin Hurley
(74) *Attorney, Agent, or Firm* — Smartpat PLC

(57) ABSTRACT

A device for shortening the spring path of a suspension fork for bicycles includes a cable; a fixing device for fixing the cable to the suspension fork tubes, which can be moved relative to the bicycle frame; and a cable clamping device, which can be secured in the region of the handlebar, preferably on the front-end section, for detachably fixing the cable, wherein the spring path is shortened in an infinitely variable manner. Thus, an infinitely variable lowering device is produced which is independent of a suspension fork.

12 Claims, 5 Drawing Sheets

DEVICE FOR SHORTENING THE SPRING PATH OF A SUSPENSION FORK

CROSS REFERENCE TO RELATED APPLICATIONS

This application is the National Stage of PCT/DE2013/000288 filed on May 28, 2013, which claims priority under 35 U.S.C. §119 of German Application No. 10 2012 016 950.7 filed on Aug. 28, 2012, the disclosures of which are incorporated by reference. The international application under PCT article 21(2) was not published in English.

The invention relates to a device for shortening the suspension travel of a bicycle suspension fork. Conventional bicycle suspension fork mechanisms for shortening the suspension travel, also referred to as lowering mechanisms, are provided within the suspension fork itself. Compared with a non-lowerable suspension fork, a considerably greater number of parts is required for the lowering mechanism, leading to an increase in the number of maintenance levels. However, a particular disadvantage thereof is that the complexity of the construction is detrimental to the response of said suspension forks. A further disadvantage of such lowerable suspension forks is the fact that the additional parts increase the weight thereof. In the case of conventional suspension forks, this additional weight currently amounts to ca. 90 grams or more. By contrast, the weight of the solution proposed herein is ca. 50 grams. Furthermore, many a suspension fork is not infinitely lowerable.

In relation to the functional range of a bicycle suspension fork, a lowering action is only required in individual situations, for example when cycling uphill. In such a situation, the amount of suspension is of secondary importance, rendering the cost or benefit ratio of conventional lowerable suspension forks unfavorable, particularly when taking into account the fact that in some cases only a marginal reduction of, say, 30 mm can be achieved. In the case of the device described herein, infinitely variable lowering of up to 80% of the total suspension travel of a suspension fork can be achieved.

In recent years, mountain bikes equipped with 29-inch wheels have become more readily available on the market. The suspension forks for such mountain bikes are longer than the suspension forks employed for conventional 26-inch wheels. Such longer suspension forks are, to start with, more difficult to stow in conventional cars or station wagons. For this reason alone, a simple device for shortening the suspension travel of the suspension fork would be beneficial. Further problems arise with regard to carrying said mountain bike. The longer-length suspension forks are even more cumbersome than the shorter ones, especially when carrying the bike across rough country. However, the ability to shorten the length of the suspension forks is advantageous in both eventualities.

A device for shortening the suspension travel of a suspension fork is known from US Patent Application 2002/0074769 A1 owned by the inventor, Darek C. Barefoot, wherein the bottom end of a steel cable is attached to the fork sliders of a suspension fork. The top end of the steel cable is attached to a device for shortening the suspension travel. Although the attaching means for said cable are available, they are not released for the purpose of shortening the suspension travel. Instead, shortening of the suspension travel is effected on account of the fact that the device comprises a ratchet mechanism having linearly disposed teeth in the form of a gear rack, and a ratchet lever can be fixed in position along said "gear rack".

It is an object of the invention to provide a device for shortening the suspension travel of a suspension fork, by means of which the suspension travel of a conventional suspension fork can be reduced in a simple and cost-effective manner.

Said object is achieved by means of a device for shortening the suspension travel of a bicycle suspension fork, which device consists of a cable, a fixing device for attaching the cable to the tubes of the suspension fork that are movable in relation to the bicycle frame, and a cable clamping device for releasably arresting said cable and disposed in the region of the handlebar, preferably on its stem, said shortening effect being infinitely variable.

For the purpose of facilitating the ease of lowering of the suspension fork against the force thereof, in particular while cycling, it is advantageous to guide the cable around at least one deflecting pulley wheel. In this regard, a pulley comprising two pulley wheels has proved to be advantageous. One of said pulley wheels can be attached to the fixing device, and the other to the cable clamping device.

It is of particular advantage when the cable clamping device comprises a lever mechanism for clamping the cable. Such a lever mechanism is advantageously designed such that the cable remains clamped when the lever is in the releasing position and is released only when tension is removed therefrom.

While cycling, in particular with the suspension fork not lowered, the cable, or, more specifically, the pulley formed by the cable and the deflecting pulley wheel, becomes shorter on springing in, due to the fact that the length of the cable or, more specifically, of the pulley is constant in relation to the flexible suspension fork, and is thus caused to sway back and forth or to flap. For the purpose of reducing such swaying as far as possible, it is proposed that the pulley, or at least the pulley cables, be surrounded by an elastic sleeve, for example a neoprene sleeve.

It is particularly advantageous when the fixing device and/or the cable clamping device can be removably attached to the bicycle. Due to the particularly simple construction of the entire device, it can be readily mounted and demounted and stored, for example, in the cyclist's backpack.

A further object of the invention relates to the use of a cable clamping device for releasably arresting a taught cable on a device for shortening the suspension travel of a suspension fork.

Such a cable clamping device is advantageously formed so as to consist of a spring-loaded clamping body and comprises a lever mechanism having a fixing position and a releasing position, in which clamping of the cable in the fixing position of the lever takes place automatically in the direction of pull of the cable, as caused by the spring force of the suspension fork, and in which a spring force acting upon the clamping body releases clamping of the cable when the lever is in the releasing position and tension is removed from the cable.

It is particularly advantageous when the cable clamping device is designed such that it can be easily mounted and demounted in the handlebar region, more particularly on the stem.

A further object of the invention relates to a fixing device for the tubes of the suspension fork that are movable relatively to the bicycle frame, the fixing device being designed such that it comprises a device for releasable arrestment of a cable or cable accommodating means (R2). It is particularly advantageous when the device for releasable arrestment of the cable or the cable accommodating means is integrated in the fixing device. In this instance, the pulley can, for example, be mounted in a simple manner on the fixing device by means of its bottom pulley wheel R1.

Finally, the invention relates to a device for attaching a cable clamping device, which device is preferably disposed in the handlebar region of a bicycle. It is advantageous when the fixing device is designed such that the cable clamping device can be easily attached and released by hand. In the case of conventional stems, it can advantageously be designed as an independently marketable clamping member, two of each such clamping members being used for specific types of handlebar stems, with the result that only the forward clamps of a handlebar stem need to be replaced. However, a separate, independently marketable handlebar stem may be provided, wholly adapted to the relevant load requirements of the entire system, even if the clamp design described above does not differ. This design of the invention can, of course, also be used for handlebar stems, more particularly for single-piece handlebar stems, the clamping members of which for clamping the handlebar are not of a multi-piece design but may, for example, be slotted. In the case of some prior art handlebar stems, the handlebar is held in the clamp by a type of punch. Therefore, importance is not placed on the particular design of a handle bar stem, but on the fact that a device for attaching a cable clamping device is attached thereto.

An exemplary embodiment of the invention is described below with reference to the drawings, in which.

Figure 5:
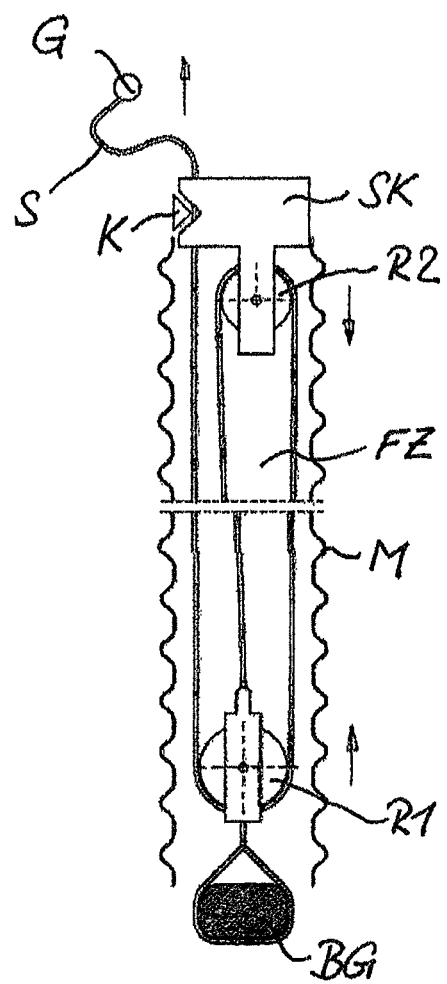
Figure 8:
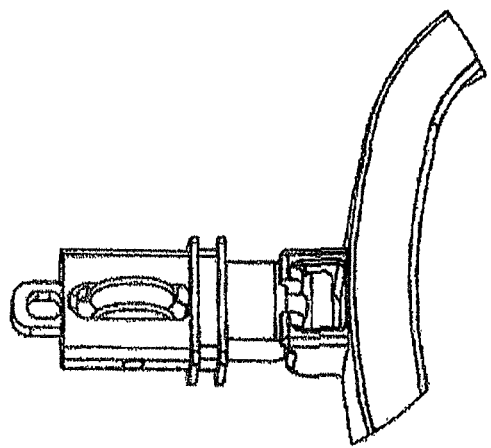
Figure 7:
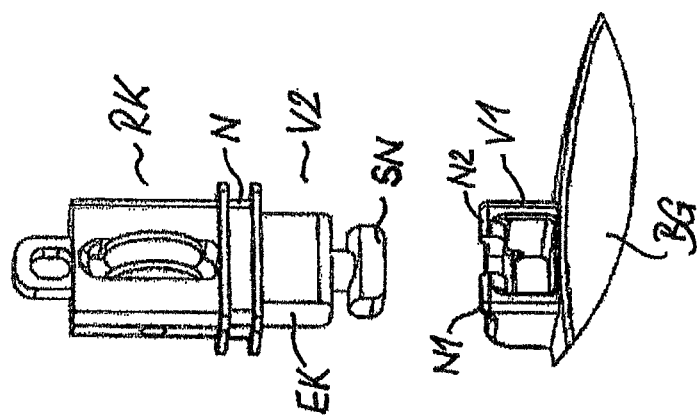
Figure 6:
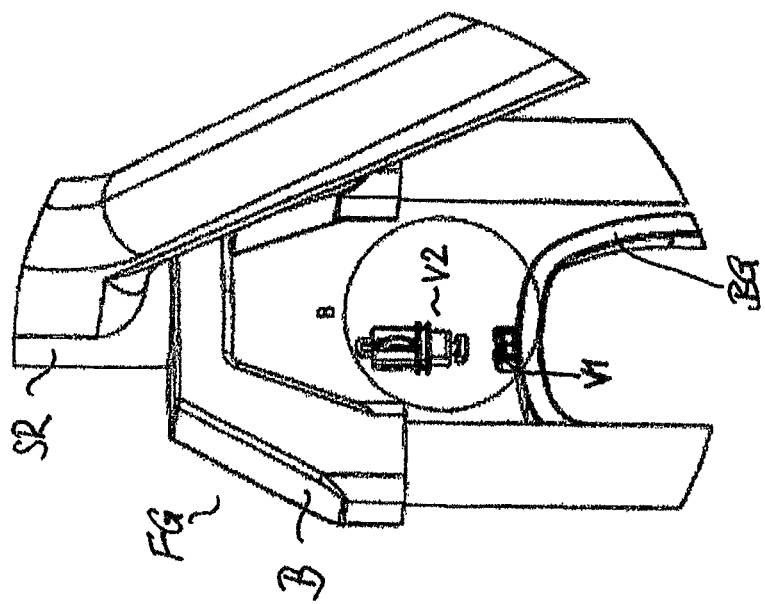
Figure 10:
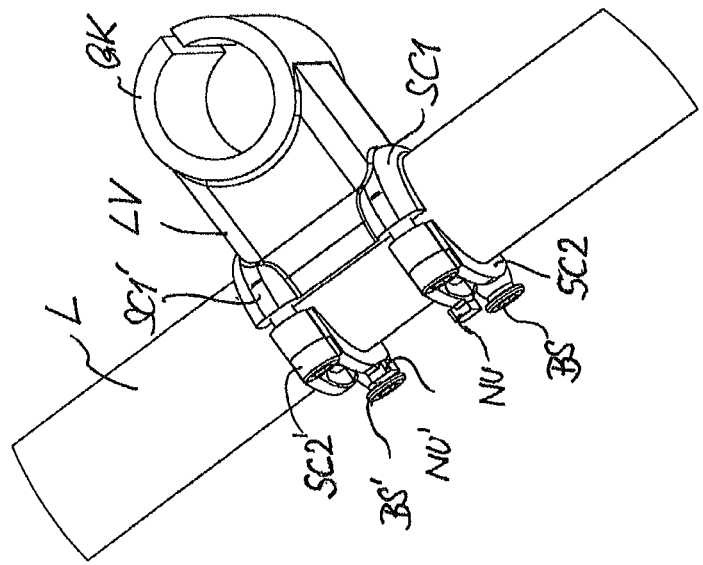
Figure 9:
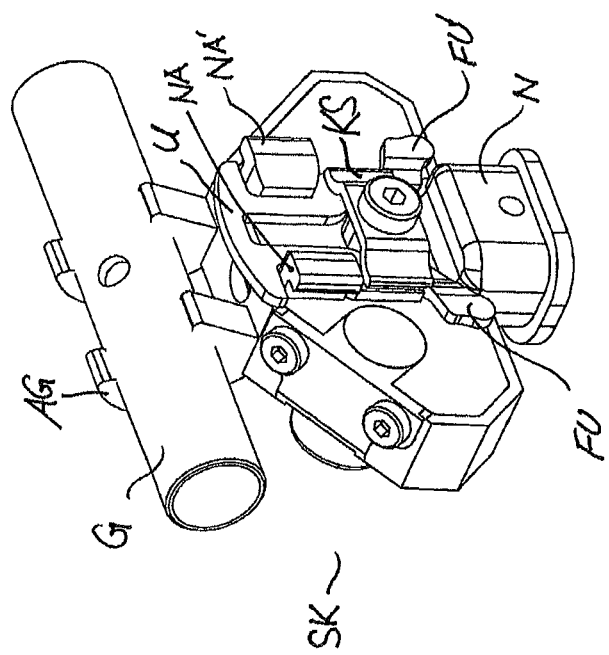

FIG. 5 shows the basic construction of the device for shortening the suspension travel of a suspension fork FG FIGS. 6 to 8 show an embodiment of a device for attaching a pulley wheel to said fixing device FIG. 9 shows the reverse side of a cable clamping device SK comprising fixing means FIG. 10 shows a handlebar stem comprising a device for the releasable attachment of said cable clamping device.

Figure 1:
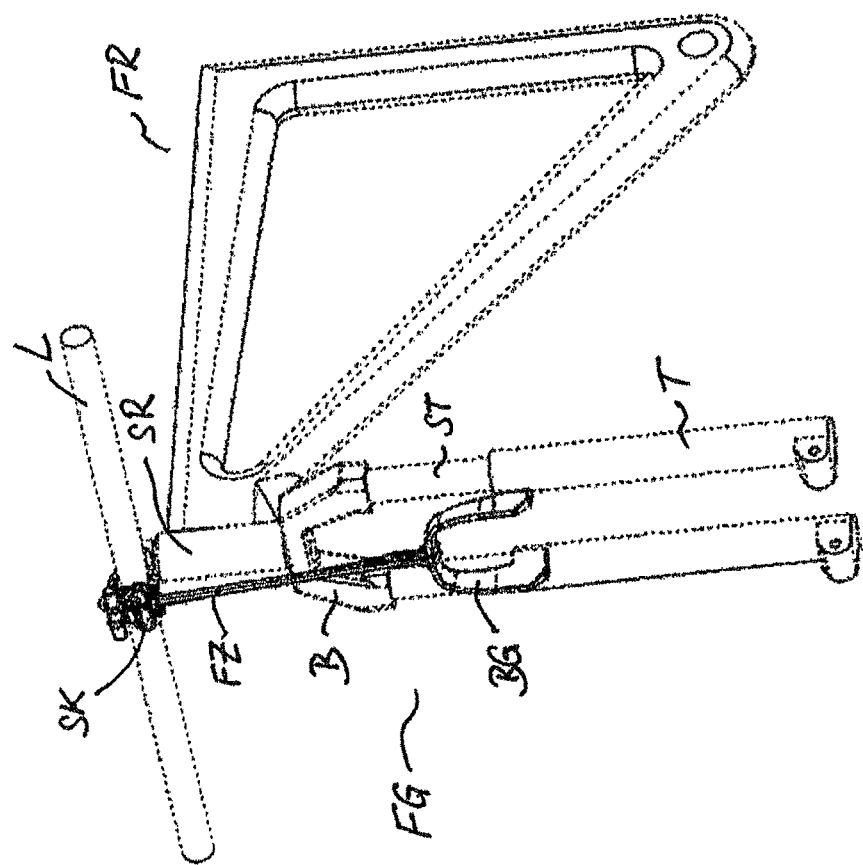
FIG. 1 is a diagrammatic view of a bicycle frame FR comprising a suspension fork FG and a handlebar L

The diagrammatic view of the bicycle frame FR displayed in FIG. 1 shows the bicycle frame FR comprising the suspension fork FG fixed within the head tube SR. The stanchion tubes ST of the suspension fork FG are connected to each other by means of a bridge B and the fork sliders T are connected to a fixing device BG of the suspension fork FG. In the exemplary embodiment, said fixing device BG is the triple clamp (to be distinguished from the triple clamp B connecting the stanchion tubes ST of the suspension fork FG) that is a standard part of the 'right-side-up' suspension fork FG shown here. Attached to the fixing device BG is a pulley FZ, the top end of which is attached to the cable clamping device SK.

Figure 2:
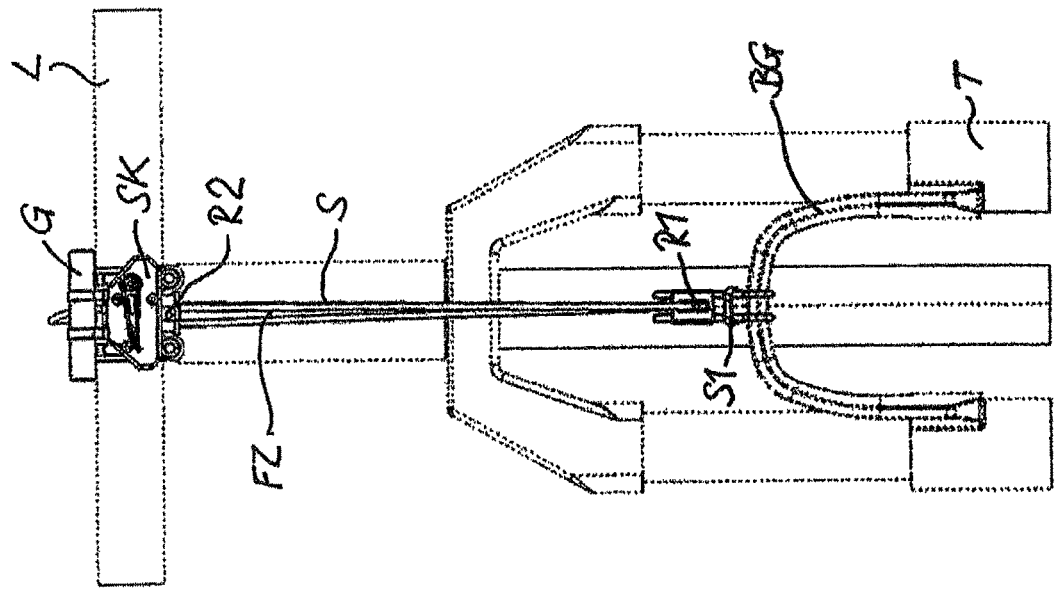
FIG. 2 is the front view of FIG. 1

The diagrammatic view displayed in FIG. 2 reveals the pulley FZ and the attachment thereof in greater detail. A first pulley wheel R1 is attached to the fixing device BG by means of a cable S1, for example a cord. A second pulley wheel R2 is attached to the cable clamping device SK, more specifically, is integrated therein. The cable S is guided around the first and second pulley wheels R1 and R2 so as to form a pulley.

The cable clamping device SK is fixed to the stem of the handlebar L. It can be firmly bolted to the stem, but preference is given to a connection that allows for the cable clamping device SK to be manually attached or released.

The loose end of the cable S is guided through the cable clamping device SK and attached to a handle G. The handle G can be clicked into an appropriate socket AG.

The function of the cable clamping device SK is described below with reference to FIGS. 3 and 4. The cable clamping device SK is attached to the handlebar's stem by means of four fixing means M. It comprises a lever H, the axle bolt A1 of which is eccentrically designed. A spring FS consisting, in the present exemplary embodiment, of spring metal wire is provided beneath the eccentric axle bolt A1. Said spring FS is accommodated by a bearing LG on the right-hand side and is attached to the clamping body K and is rotatable about the axis A2 on the left-hand side. The cam of the axle bolt A1 exerts no force on the spring metal FS in the fixing position H1 of the lever H. The clamping body K is rotatable about the axis A3. A leaf spring BF exerts an upward force against the spring metal FS.

Figure 3:
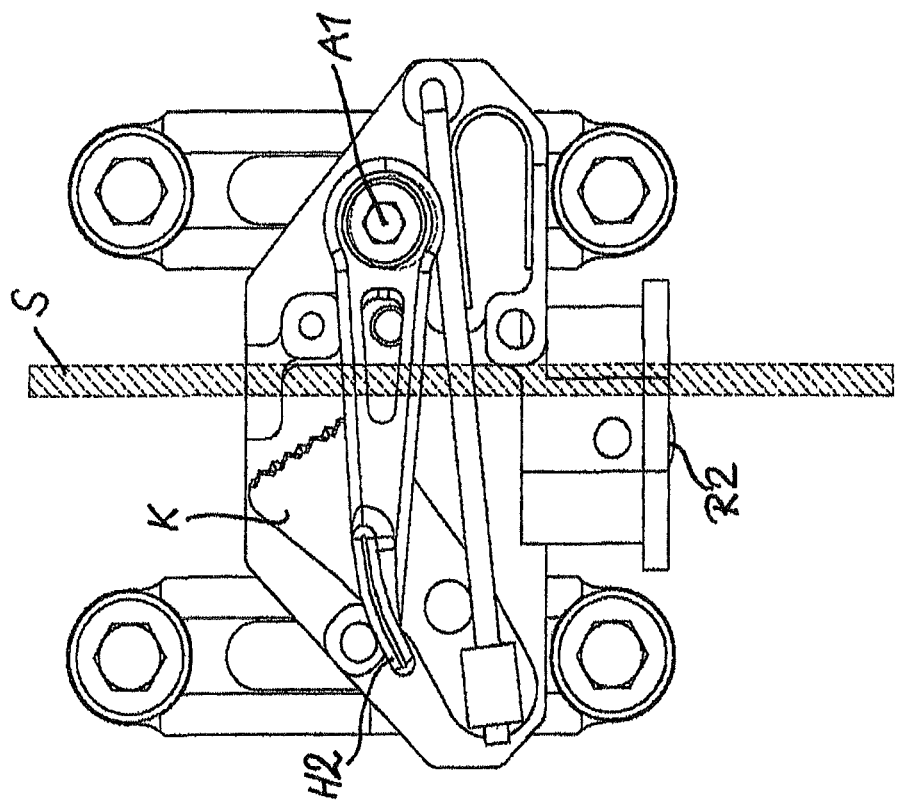
FIG. 3 shows a cable clamping device SK in the fixing position

Prior to establishment of the status shown in FIG. 3, that is to say, prior to the cable S being gripped by the clamping body K, said body is more or less gently pushed against the cable S. In this respect reference is made to the status shown in FIG. 4. In the event of the lever H being moved from the releasing position H2 shown in FIG. 4 to the fixing position H1 (FIG. 3), the leaf spring BF can push the spring metal FS upwardly to cause the clamping body K to swivel about the axis A3 in a clockwise direction. The clamping body K thus makes slight contact with the cable S. When, for the purpose of shortening the suspension travel of the suspension fork FG, the cable S is subsequently pulled in the direction of the arrow in opposition to the force of the suspension fork and then released, the clamping body K is entrained on account of the friction caused by the cable S, and the cable S becomes clamped between the clamping body K and the contact surface F.

Figure 4:
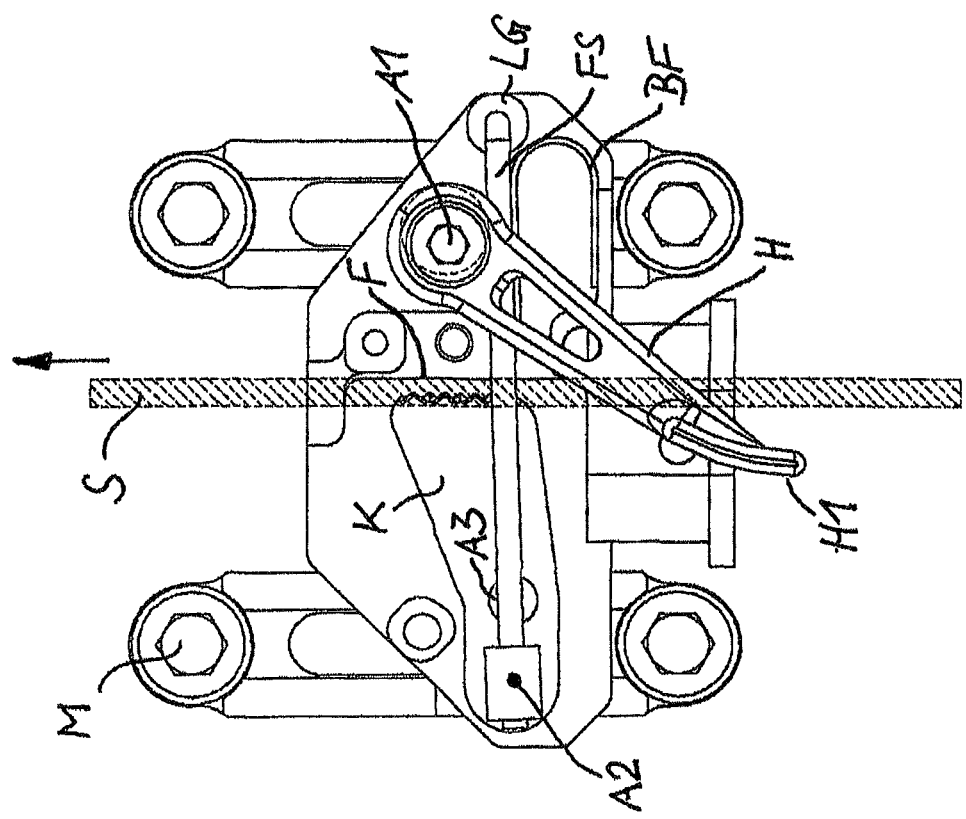
FIG. 4 shows said cable clamping device SK in the releasing position

When the lever H is subsequently moved to the releasing position H2, as shown in FIG. 4, the cam of the axle bolt A1 initially exerts a force on the spring metal FS and pre-tensions it. Due to the tension on the cable S, the clamping body K initially remains in the clamping position. In the event of the tension being removed from the cable S, for example by the handlebar being pushed downwardly under the weight of the cyclist so as to cause the suspension fork to spring in slightly, or by causing the cable S to be pulled up to a slight extent by means of the handle G, the clamping body K will be released and caused to swivel upwardly due to the force of the spring metal FS, thus fully releasing the cable S, enabling the suspension fork FG to spring out entirely.

The basic construction of the device for shortening the suspension travel of a suspension fork FG will now be explained with reference to the diagrammatic drawing shown in FIG. 5. The second pulley wheel R2 of the pulley FZ is attached to the cable clamping device SK. The first pulley wheel R1 is attached to the fixing device BG. One end of the cable S is attached to the first pulley wheel R1 and the other end of cable S is guided through the cable clamping device SK shown diagrammatically, to terminate at the handle G. The entire pulley FZ is enclosed in a flexible sleeve M, which may be made of neoprene, for example. Said neoprene sleeve M is attached at one end to the cable clamping device SK and at the other end to the fixing device BG. When the suspension travel of the suspension fork FG is not shortened, the neoprene sleeve M is stretched. When the suspension fork FG springs in in this condition, the distance between the cable clamping device SK and the fixing device BG shortens, causing the elastic sleeve M to buckle. Any swaying or flapping of the cables is thus greatly reduced. Such swaying or flapping can be further reduced if, additionally, a simple elastic band (not shown), having a width of, say, 3 mm, is elastically spanned between the first and second pulley wheels R1, R2. The tension should be slightly greater than that of the sleeve M.

Advantageously, the cable clamping device SK and the carrier for the first pulley wheel R1 or the fixing device BG are designed such that the elastic sleeve M can be simply attached thereto. To this end, a circumferential groove N (see FIGS. 7 and 8), for example, may be provided to which the sleeve M can be fitted, for example by means of a cable tie.

FIGS. 6 and 7 show one of a plurality of possible embodiments for attaching the pulley wheel R1 to the fixing device BG. FIG. 6 shows a portion of the suspension fork FG comprising the triple clamp B, the head tube SR, and the fixing device BG. The fixing device BG comprises a receiving device V1 that is either mounted on, or attached to, the fixing device BG, or is already integrally united with the same. The pulley wheel body RK is attached to said receiving device V1. This is described below with reference to FIGS. 7 and 8.

In its bottom portion, i.e. that below the groove N, the pulley body RK of FIG. 7 comprises a fixing device V2 consisting of an elastic body EK and a suspension pebble SN. The receiving device V1 comprises two symmetrical protrusions N1 and N2 in its front upper region. The suspension pebble SN is introduced diagonally into the receiving device V1 and is pushed over the protrusions N1, N2 whilst the elastic body EK gives way and the final position shown in FIG. 8 is achieved. The device is thus readily mounted and demounted.

In the case of prior art suspension forks FG, the fixing device BG is integrally united with the fork sliders. The fork sliders comprising the fixing device BG are cast, for example, from magnesium. However, there are other suspension forks FG that are bolted to the fork sliders. In both cases, provision can be made for the receiving device V1 on the fixing device BG as described.

FIG. 9 shows the rear of a cable clamping device SK comprising fixing means for removable fixation to a handlebar stem LV (FIG. 10). The handle G is fixed in its receiving device AG. Two slot-shaped sockets NA, NA' are provided at the rear of the cable clamping device. A U-shaped spring steel bracket U, which is open at the bottom, is positioned in the space between the slot-shaped sockets NA, NA'. The spring steel bracket U rests on the upper surfaces of said slot-shaped sockets NA, NA' such that it is oriented in the downward direction. The legs of the spring steel bracket U each comprise outwardly pointing feet FU, FU' at their bottom ends. When being attached to the handlebar stem LV, as described below, the spring steel bracket U is attached to the cable clamping device SK by means of the clamp KS in such a way that it cannot move upwardly, but its legs are moveable by flexing inwardly. The other components of the cable clamping device SK, shown in the Figures described above, are not further detailed in this instance as they are not needed for the purpose of describing the mode of attachment to the handlebar stem LV.

FIG. 10 shows a handlebar stem LV, designed such that the cable clamping device SK, described in FIG. 9, can be removably attached. The steer tube clamp GK encompassing the steer tube (not shown) or, more specifically, the driver tube, is only shown diagrammatically. Clamping of the handle bar L in the handlebar stem LV takes place by means of the clamp members SC1, SC1', and SC2, SC2'. The two clamp members SC2, SC2' are specifically designed to receive the cable clamping device SK as described with reference to FIG. 9. To this end, two groove springs NU, NU' and two collar screws BS, BS' are provided on each clamping member SC2, SC2'.

For the purpose of mounting it on the handlebar stem LV, the cable clamping device SK (FIG. 9) is attached such that the slot-shaped sockets NA, NA' are above the groove springs NU, NU' and the feet FU, FU' of the spring steel bracket U are above the collar screws BS, BS'. When the cable clamping device SK is pushed down by hand, the spring steel brackets are pushed inwardly and past the inner face of the collar screws BS, BS'. In the final position, the legs of the spring steel bracket U spring back in an outward direction so that the feet FU, FU' make contact with the collar screws BS, BS' from below and the cable clamping device SK can only be separated from the handlebar stem LV in an upward direction against the pressure of the legs of spring steel bracket U. A device for shortening the suspension travel of a suspension fork is thus created that can be readily mounted or demounted as required.

The device might also be designed such that the cable clamping device SK is permanently mounted while the pulley wheel R2 is removably attached to the cable clamping device SK. In that case, the cable clamping device SK should be designed such that the cable S can be simply laid inside it. With such an embodiment, the pulley could be simply detached when the device for shortening the suspension travel is not required, while the cable clamping device SK would remain on the bicycle.

One special case of the suspension fork FG is the so-called "Lefty", made by Canondale. This comprises only one stanchion ST and only one fork slider T. The present invention can also be used in conjunction with such a suspension fork, if provision is made for the pull on the fork slider T to be as parallel thereto as possible. This may be realized, for example, by the use of additional deflecting pulley wheels. In this regard, the feature of claim 1, according to which a fixing device is provided on the tubes of the suspension fork that are movable relatively to the bicycle frame, should be understood to refer to only one movable tube.

The cable S as described in the exemplary embodiment and mentioned in the claims may alternatively be in tape-form.

I claim:

1. A device for shortening suspension travel of a bicycle suspension fork, comprising:
   a cable,
   a fixing device for attaching said cable to movable tubes of said suspension fork, and
   a cable clamping device having a lever mechanism for releasably arresting said cable, the cable clamping device being disposed at a handlebar,
   wherein said shortening of said suspension travel is infinitely variable.

2. The device as claimed in claim 1, wherein said cable is guided around at least one pulley wheel.

3. The device as claimed in claim 2, wherein a first pulley wheel is attached to said fixing device.

4. The device as claimed in claim 3, wherein a second pulley wheel is attached to said cable clamping device or is an integral component of said cable clamping device.

5. The device as claimed in claim 1, wherein said cable remains arrested when said lever mechanism is in a release position until tension is removed from said cable.

6. The device as claimed in claim 4, wherein a pulley formed by said cable and said first pulley wheel and said second pulley wheel is enclosed in an elastic sleeve.

7. The device as claimed in claim 1, wherein said fixing device is removably attached.

8. The device as claimed in claim 1, wherein said cable clamping device is removably attached.

9. The device as in claim 1, wherein the cable clamping device comprises a clamping body loaded by a spring, and
   wherein the lever mechanism has an arresting position and a releasing position,
   wherein clamping of said cable in said arresting position takes place automatically in the direction of pull of said cable and
   wherein clamping of said cable is released due to force from said spring acting on said clamping body when said lever mechanism is in the releasing position and tension is removed from said cable.

10. The device as in claim 9, wherein the cable clamping device is capable of being mounted and demounted on a stem of a bicycle.

11. The device as in claim 1, wherein the cable clamping device is arranged at a stem of the handlebar.

12. A method for shortening suspension travel of a suspension fork, comprising:
   providing a suspension fork with movable tubes;
   providing a handlebar;
   providing a cable;
   attaching the cable to the movable tubes with a fixing device; and
   operating a lever mechanism of a cable clamping device to releasable arrest the cable at the handlebar.

* * * * *